United States Patent [19]

Schaub

[11] Patent Number: 5,607,322
[45] Date of Patent: Mar. 4, 1997

[54] ONE-WAY BATTERY RECEPTACLE

[75] Inventor: Bernhard Schaub, University Heights, Ohio

[73] Assignee: Century Products Company, Macedonia, Ohio

[21] Appl. No.: 555,937

[22] Filed: Nov. 13, 1995

[51] Int. Cl.$^6$ ........................................ H01R 3/00
[52] U.S. Cl. ........................ 439/500; 429/1; 429/100
[58] Field of Search ............................ 439/500; 429/1, 429/96, 99, 100, 123

[56] References Cited

U.S. PATENT DOCUMENTS

| | | | |
|---|---|---|---|
| 4,383,007 | 5/1983 | Murphy | 429/1 |
| 4,595,641 | 6/1986 | Giurtino | 429/1 |
| 4,737,420 | 4/1988 | Ikeda et al. | 429/1 |
| 5,194,340 | 3/1993 | Kosako | 429/1 |
| 5,376,476 | 12/1994 | Eylon | 429/1 |
| 5,431,575 | 7/1995 | Engira | 439/500 |

*Primary Examiner*—Neil Abrams
*Assistant Examiner*—Brian J. Biggi
*Attorney, Agent, or Firm*—Graham & James LLP

[57] ABSTRACT

A battery receptacle has first and second types of electrical contacts received in guide slots formed in facing end wall surfaces of a housing. The first type of electrical contact has a inwardly facing protrusion extending inwardly of the compartment a distance sufficient to be engaged by the positive electrical contact of a battery but less than the distance required to make contact with the negative electrical contact of the battery. The second type of electrical contact is a tapered spring contact with the wide end positioned inwardly of the receptacle, the diameter of the wide end being larger than the diameter of the positive contact of a battery. With batteries correctly installed, the first type of contact engages the positive contact of the battery and the second type of contact engages the negative contact of the battery. In any other configuration, at least one of the electrical contacts is not engaged with a battery contact. A movable partition positioned within the receptacle partially divides the compartment in two longitudinally to assist in guiding installation of each battery and to accommodate batteries of different lengths.

8 Claims, 2 Drawing Sheets

ONE-WAY BATTERY RECEPTACLE

BACKGROUND OF THE INVENTION

This invention relates to receptacles for holding batteries used to power a wide variety of electrical circuits in various products. More particularly, this invention relates to a receptacle with provision for ensuring that incorrect installation of the batteries will result in no electrical path through the batteries.

Batteries are used in a wide variety of products as a source of DC electrical power. All products having electrical circuitry designed to be powered by batteries have some type of battery compartment for physically containing the batteries and also for enabling electrical connection through the batteries between a positive output terminal and to a negative output terminal. Various numbers of batteries are employed in various products, and different electrical configurations are known and used (i.e., all series, all parallel, or series-parallel electrical connections).

In all applications, care must be taken to ensure that the batteries are installed with the proper polarity in order to ensure the correct electrical correction among the batteries. Incorrect installation of one or more batteries will usually result in an inoperable electrical circuit, which is inconvenient. However, in some cases, improper electrical connection of a plurality of batteries (such as a D-cell size set) can result in excessive physical deterioration of the battery and even an acid leak from one or more of the cells. In applications in which the battery acid can exude from the receptacle, a serious potential or actual danger can be presented.

SUMMARY OF THE INVENTION

The invention comprises a battery receptacle designed such that the incorrect placement of the batteries within the receptacle cannot result in a complete electrical circuit through the batteries: i.e., ensures an open circuit along the battery path, even though some of the battery contacts may be in physical engagement.

In its broadest aspect, the invention includes a housing having a pair of facing end wall surfaces and a battery receiving region therebetween, which may accommodate one or more rows of multiple cells of batteries. Each one of the pair of facing end wall surfaces has an electrical contact mounting structure with an inwardly extending electrically non-conductive surface, the structure preferably comprising a pair of raised ribs defining a pair of mounting slots.

First and second types of electrically conductive contacts are designed to be received in the mounting structures, with each type of electrically conductive contact including a body member having opposing edge portions dimensioned to be received in the slots. The first type of electrically conductive contact has a protruding contact portion which extends from the body member a sufficient distance to be contacted by the positive contact of a battery, but an insufficient distance to be contacted by the negative contact of a battery. The second type of electrically conductive contact has an apertured free inner end engagable with the negative contact of a battery but having an aperture too large to physically engage the positive contact of a battery. In a preferred embodiment, the second type of contact is a tapered spring contact.

An electrically non-conductive partition is positioned within the battery receptacle transversely of the longitudinal axis thereof and serves to assist in positioning the individual cells within the receptacle. The partition is provided with a relieved corner portion to accommodate the positive electrical contact of a battery. The partition is also slidably arranged to accommodate batteries of various lengths.

Correct installation of a series of batteries in the receptacle results in the proper electrical connections through the array of cells between a positive output terminal and a negative output terminal. Any incorrect installation of the battery cells results in an open circuit, which eliminates the danger of premature battery failure or the formation of acid due to improper polarity connections. For multi-branch receptacles (i.e., those in which parallel rows of batteries may be installed), a plurality of first and second types of electrical contacts are installed on the facing and wall surfaces on a row-by-row basis, with the types of contacts being chosen on the basis of the desired electrical battery configuration: i.e., full series, full parallel, or series-parallel.

For a fuller understanding of the nature and advantages of the invention, reference should be made to the ensuing detailed description, taken in conjunction with the accompanying drawings.

DETAILED DESCRIPTION OF THE PREFERRED EMBODIMENTS

Figure 1:
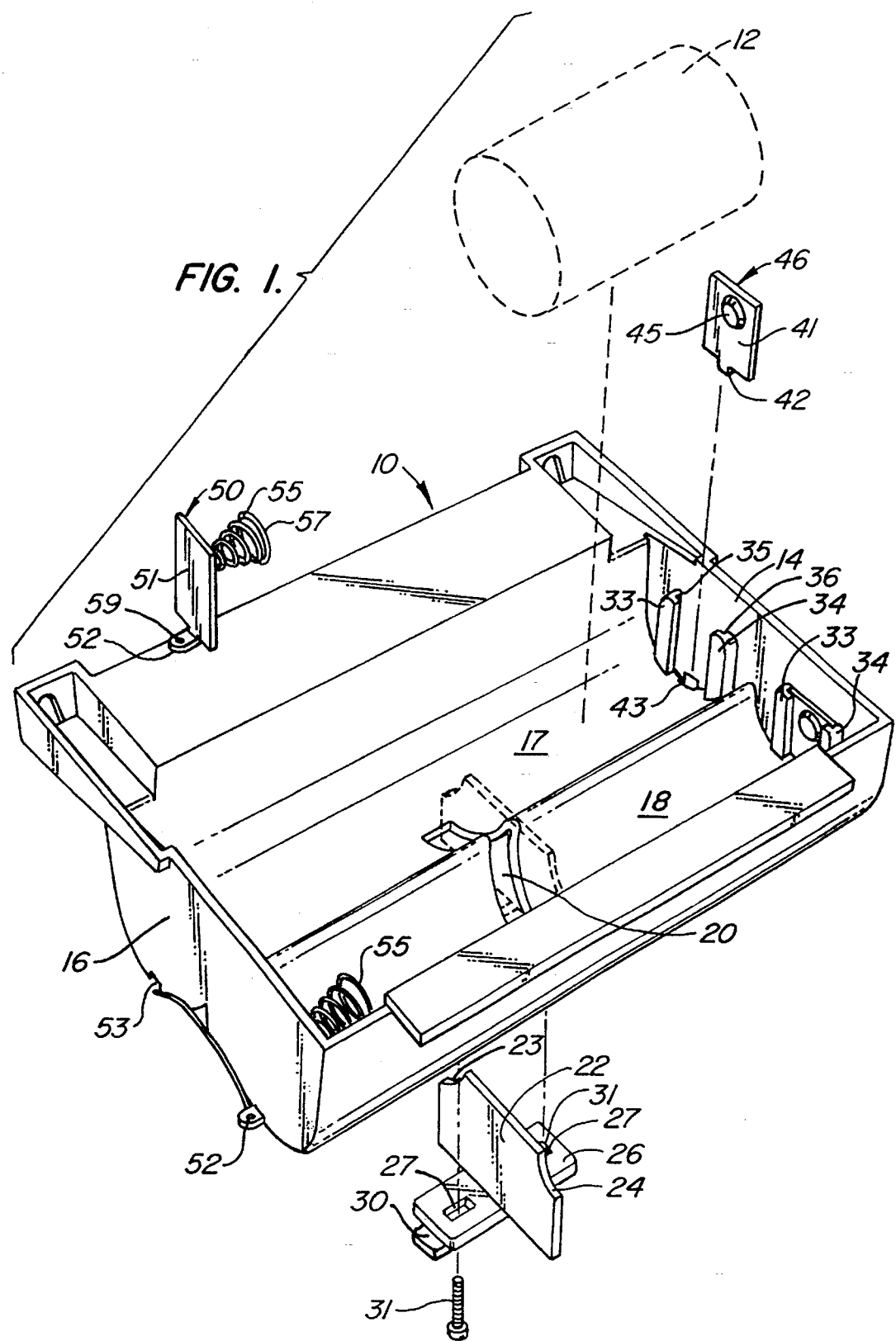
FIG. 1 is an exploded perspective view of a preferred embodiment of the invention.

Turning now to the drawings, FIG. 1 is a perspective view of the preferred embodiment of the invention with some of the individual elements removed from their mounting locations. As seen in this figure, a battery receptacle generally designated with reference numeral 10 is designed to accommodate a plurality of dry cell batteries (four D-cell batteries in the preferred embodiment), with one of the batteries 12 illustrated in broken lines. Receptacle 10 is a unitary member preferably molded from a suitable plastic material and includes end walls 14, 16 and a generally cylindrically curved inner bottom wall surface defining generally concave receptacle surfaces 17, 18 for batteries of the size to be accommodated by receptacle 10. A slot 20 is formed transversely of the longitudinal axis of surfaces 17, 18 in order to accommodate a separation partition 22 having a pair of relieved corner portions in the form of curved notches 23, 24 in the preferred embodiment. Partition 22 has a base portion 26 having oversized apertures 27 which permit limited lateral and longitudinal movement in order to accommodate batteries of different length. Partition 22 is secured to the underside of receptacle 10 by means of an apertured keeper plate 30 (shown in section in FIGS. 3 and 4) and a pair of fasteners 31.

The inside surface of each end wall 14, 16 of receptacle 10 is provided with an integrally formed contact receptacle or electrical contact mounting means in the form of a pair of laterally spaced upstanding integral ribs 33, 34 each having a generally L-shaped cross-section so as to provide a pair of guide slots 35, 36. Guide slots 35, 36 are dimensioned and spaced to snugly accommodate an ohmic electrical contact member provided for the purpose of facilitating ohmic electrical contact to the battery electrodes. There are two types of ohmic contact members: a first type generally designated with reference numeral 40 for contacting the positive battery contact, and a second type generally designated with reference numeral 50 for contacting the negative battery contact. Both elements 40 and 50 each comprises a substantially flat body member 41, 51 terminating in a lower contact terminal tab 42, 52, which is initially straight but which is bent at an angle with respect to body members 41, 51 when installed in corresponding apertures 43, 53 formed at the junction between the inner wall surface of end walls 14, 16 and the concave receptacle surfaces 17, 18.

Figure 3:
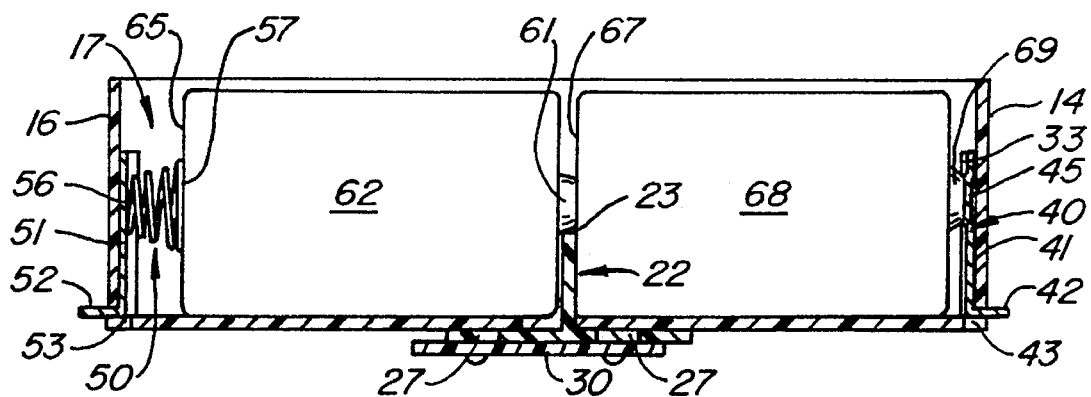
FIG. 3 is a sectional view illustrating a pair of batteries correctly installed.
Figure 4:
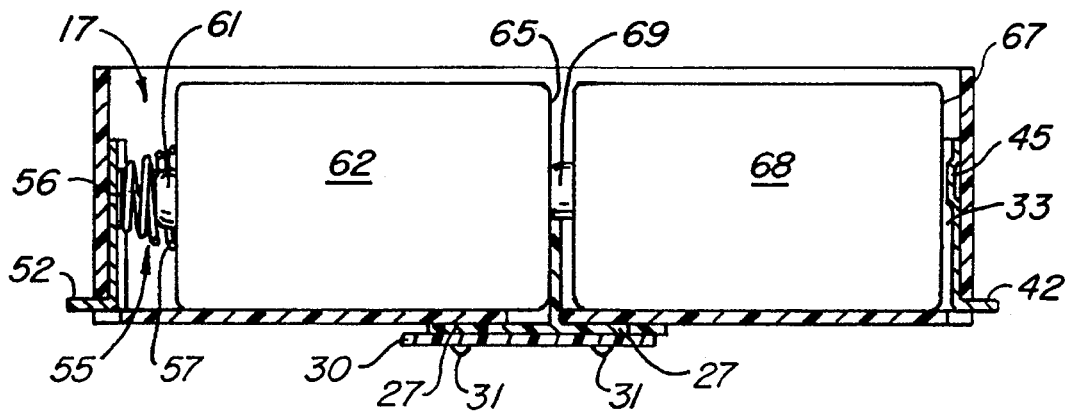
FIG. 4 is a sectional view similar to FIG. 3 illustrating a pair of batteries installed incorrectly.

Positive type contact members 40 include a raised positive contact protrusion 45 which extends inwardly of receptacle 10 when element 40 is mounted in the corresponding slots 35, 36. However, as best seen in FIGS. 3 and 4, the outer surface of protrusion 45 terminates in a point or plane outboard of a plane tangent to the electrically non-conductive surface of ribs 33, 34. Elements 50 are provided with appropriate contacts illustrated as coiled spring elements 55 having a small diameter end 56 secured to element 51 in any suitable fashion (such as soldering, use of a mechanical tab, staking or the like); and a larger diameter free end 57 for contacting the negative contact of battery 12. The diameter of free end 57 of contact element 55 is sufficiently greater than the diameter of the conventional battery positive contact so as to avoid physical or ohmic contact therewith as described more fully below.

Each one of tabs 42, 52 is provided with a small aperture, such as aperture 59 shown for element 50 in FIG. 1, in order to accommodate a conductive wire (not illustrated) for providing positive and negative voltage and current output connections to an appropriate plug or socket for the associated electrical circuitry to be powered by the batteries.

It is important to note that the rails 33, 34 are sized to accommodate both type 40 and type 50 contact elements. Thus, the receptacle can be configured in a full series four battery array or a two cell series parallel arrangement as illustrated in FIG. 1.

Figure 2:
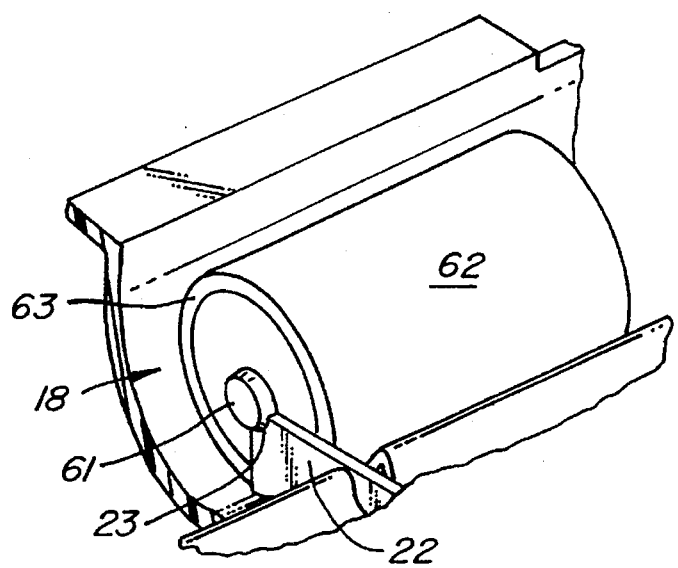
FIG. 2 is a detailed view illustrating the relationship between the central partition and the positive battery contact.

FIG. 2 illustrates the manner in which relieved corner portions or notches 23 cooperate with the positive contact element 61 of a battery 62 when the battery is received within one of the recesses 17, 18. As seen in this figure, the contact element 61 extends past the opposite surface of partition 22 to that encountered by the shoulder 63 of the battery 62 in order to properly contact the negative contact surface of a mating battery (not shown).

FIG. 3 is a sectional view illustrating proper installation of a pair of batteries in one of the receptacle surfaces 17, 18. As seen in this figure, a first battery 62 is received within receptacle surface 17 with the negative contact surface 65 in contact with the enlarged end 57 of contact member 50. The positive contact element 61 of battery 62 extends across shoulder 23 of partition 22 and makes contact with the negative contact element 67 of a second battery 68. The positive contact element 69 of battery 68 makes contact with protrusion 45 of contact element 40. Voltage and current from the pair of batteries is available at terminal tabs 42, 52.

FIG. 4. illustrates the same pair of batteries 62, 68 installed in reverse fashion in the same receptacle surface 17. The negative contact element 67 of battery 68 contacts the innermost surface of ribs 33, 34, but cannot contact protrusion 45, due to the fact that the protrusion 45 terminates outboard of the inner surface of ribs 33, 34. The positive contact element 61 of battery 62 is positioned centrally of spring contact 55 but does not make contact with contact member 50 due to the enlarged diameter of inner end 57. As a consequence, there is no electrical continuity between the output terminals 42, 52, and an electrical circuit cannot be established through batteries 62, 68.

As will be appreciated by those skilled in the art, the same electrical results obtain if batteries 62, 68 are installed incorrectly with both positive contact elements 61, 69 facing one another: in this configuration (not illustrated) the negative contact element (e.g. element 67 of battery 68) will not make contact with protrusion 45, thus preventing electrical continuity in the path between output terminals 42 and 52. Similarly, if batteries 62, 68 are installed incorrectly with both negative contact elements 61, 67 facing one another, partition 22 will prevent mutual contact therebetween. In addition, positive contact element 61 will be arranged within the large end 57 of spring contact 50 in the manner shown in FIG. 4. As a consequence, there will be no electrical continuity between terminals 42 and 52.

As will now be apparent, the invention affords a relatively inexpensive and simple solution to the problems encountered when dry cell batteries are incorrectly installed in a battery receptacle. More particularly, in battery compartments constructed in accordance with the teachings of the invention, only one correct arrangement of the batteries will result in physical and ohmic contact with the conductive contact members of the battery receptacle. All other configurations will result in at least one necessary contact missing, so that an open circuit is guaranteed for all but the single proper configuration. In addition, the inclusion of movable partition 22 automatically accommodates batteries of different length.

While the invention has been illustrated as a dual compartment receptacle for containing four batteries, other configurations will be apparent to those skilled in the art. For example, a single bay configuration for accommodating two batteries may be used; or a multiple bay receptacle for housing six or more batteries may be designed, as desired. Further, while the invention has been described with reference to battery receiving regions 17, 18 having sufficient length to accommodate a pair of batteries, receptacles may be employed capable of receiving three or more cells in a series arrangement. In such variations, a plurality of partitions 22 may be employed at the approximate junctions between abutting batteries.

While the above provides a full and complete disclosure of the preferred embodiments of the invention, various modifications, alternate constructions and equivalents may be employed, as desired. For example, while the invention has been disclosed and illustrated with respect to "D" sized batteries, the same principles apply to batteries of any size. Further, while the preferred embodiment has been illustrated with an electrical configuration in which two pairs of serially connected batteries are electrically connected in parallel, other electrical arrangements may be provided. For example, by exchanging the type 40 and type 50 contact elements in one of the two receptacle surfaces 17, 18, a series connected array of four batteries may be employed. Therefore, the above description and illustrations should not be construed as limiting the scope of the invention, which is defined by the appended claims.

What is claimed is:

1. A battery receptacle for preventing incorrect electrical connection between a pair of dry cell batteries each having a positive contact element and a negative contact element, said receptacle comprising:

a housing having a pair of facing end wall surfaces and a battery receiving region therebetween, each one of said pair of end wall surfaces having an electrical contact mounting means with an electrically non-conductive exposed surface;

a first electrically conductive contact secured to one of said electrical contact mounting means and engagable with only one of the electrical contact elements of one of the pair of batteries;

a second electrically conductive contact secured to the other one of said electrical contact mounting means and engagable with only the other one of the electrical contact elements of the other one of the pair of batteries; and an electrically non-conductive partition extending laterally of said battery receiving region, and mounted for limited movement in said battery receiving region to accommodate batteries of different length.

2. The invention of claim 1 wherein said housing has first and second battery receiving regions extending substantially in parallel between said pair of facing end wall surfaces.

3. The invention of claim 1 wherein said battery receiving region has sufficient length to accommodate at least two batteries.

4. The invention of claim 1 wherein said partition has a relieved corner portion for enabling the positive electrical contact element of a battery to extend beyond said partition.

5. The invention of claim 1 wherein said electrical contact mounting means comprises a pair of guide slots formed in the associated wall surface for receiving a portion of one of said first and second electrically conductive contacts.

6. The invention of claim 5 wherein said first and second electrically conductive contacts each includes a body member having opposing edge portions dimensioned to be received in said slots.

7. The invention of claim 1 wherein said first electrically conductive contact comprises a body member having a protruding contact portion extending a predetermined distance therefrom.

8. The invention of claim 1 wherein said second electrically conductive contact comprises a body member and a spring contact having a first end secured to said body member and a free end having a diameter larger than the positive contact element of a battery.

* * * * *